United States Patent
Wold

(10) Patent No.: US 8,082,150 B2
(45) Date of Patent: *Dec. 20, 2011

(54) METHOD AND APPARATUS FOR IDENTIFYING AN UNKNOWN WORK

(75) Inventor: Erling H. Wold, El Cerrito, CA (US)

(73) Assignee: Audible Magic Corporation, Los Gatos, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 12/410,445

(22) Filed: Mar. 24, 2009

(65) Prior Publication Data

US 2009/0192640 A1      Jul. 30, 2009

Related U.S. Application Data

(63) Continuation of application No. 11/239,543, filed on Sep. 28, 2005, now Pat. No. 7,529,659, which is a continuation of application No. 10/192,783, filed on Jul. 9, 2002, now Pat. No. 6,968,337.

(60) Provisional application No. 60/304,647, filed on Jul. 10, 2001.

(51) Int. Cl.
*G10L 15/06* (2006.01)
(52) U.S. Cl. ............ 704/243; 704/257; 704/255
(58) Field of Classification Search ........ 704/200, 704/234, 243–246, 231, 250, 270, 270.1, 704/3, 7, 9, 255, 252, 257
See application file for complete search history.

(56) References Cited

U.S. PATENT DOCUMENTS

| | | | |
|---|---|---|---|
| 3,919,479 | A | 11/1975 | Moon et al. |
| 4,230,990 | A | 10/1980 | Lert, Jr. et al. |
| 4,449,249 | A | 5/1984 | Price |
| 4,450,531 | A | 5/1984 | Kenyon |
| 4,454,594 | A | 6/1984 | Hefron et al. |
| 4,677,455 | A | 6/1987 | Okajima |
| 4,677,466 | A | 6/1987 | Lert, Jr. et al. |
| 4,739,398 | A | 4/1988 | Thomas et al. |

(Continued)

FOREIGN PATENT DOCUMENTS

EP      0349106 A1      1/1990

(Continued)

OTHER PUBLICATIONS

Baum, L., et al., "A Maximization Technique Occurring in the Statistical Analysis of Probabilistic Functions of Markov Chains," *The Annals of Mathematical Statistics*, vol. 41, No. 1, pp. 164-171, 1970.

(Continued)

*Primary Examiner* — Huyen X. Vo
(74) *Attorney, Agent, or Firm* — Lowenstein Sandler PC

(57) ABSTRACT

A system for determining an identity of a received work. The system receives audio data for an unknown work. The audio data is divided into segments. The system generates a signature of the unknown work from each of the segments. Reduced dimension signatures are then generated at least a portion of the signatures. The reduced dimension signatures are then compared to reduced dimensions signatures of known works that are stored in a database. A list of candidates of known works is generated from the comparison. The signatures of the unknown works are then compared to the signatures of the known works in the list of candidates. The unknown work is then identified as the known work having signatures matching within a threshold.

15 Claims, 9 Drawing Sheets

U.S. PATENT DOCUMENTS

| | | | |
|---|---|---|---|
| 4,843,562 A | 6/1989 | Kenyon et al. |
| 4,918,730 A | 4/1990 | Schulze |
| 5,210,820 A | 5/1993 | Kenyon |
| 5,247,688 A | 9/1993 | Ishigami |
| 5,283,819 A | 2/1994 | Glick |
| 5,327,521 A | 7/1994 | Savic et al. |
| 5,437,050 A | 7/1995 | Lamb et al. |
| 5,442,645 A | 8/1995 | Ugon |
| 5,504,518 A | 4/1996 | Ellis |
| 5,581,658 A | 12/1996 | O'Hagan et al. |
| 5,588,119 A | 12/1996 | Vincent |
| 5,612,729 A | 3/1997 | Ellis et al. |
| 5,612,974 A | 3/1997 | Astrachan |
| 5,613,004 A | 3/1997 | Cooperman et al. |
| 5,638,443 A | 6/1997 | Stefik |
| 5,692,213 A | 11/1997 | Goldberg et al. |
| 5,701,452 A | 12/1997 | Siefert |
| 5,710,916 A | 1/1998 | Barbara et al. |
| 5,724,605 A | 3/1998 | Wissner |
| 5,732,193 A | 3/1998 | Aberson |
| 5,850,388 A | 12/1998 | Anderson |
| 5,881,182 A | 3/1999 | Fiete et al. |
| 5,918,223 A | 6/1999 | Blum et al. |
| 5,924,071 A | 7/1999 | Morgan et al. |
| 5,930,369 A | 7/1999 | Cox et al. |
| 5,943,422 A | 8/1999 | Van Wie et al. |
| 5,949,885 A | 9/1999 | Leighton |
| 5,959,659 A | 9/1999 | Dokic |
| 5,983,176 A | 11/1999 | Hoffert et al. |
| 6,006,183 A | 12/1999 | Lai et al. |
| 6,006,256 A | 12/1999 | Zdepski et al. |
| 6,011,758 A | 1/2000 | Dockes |
| 6,026,439 A | 2/2000 | Chowdhury |
| 6,044,402 A | 3/2000 | Jacobson |
| 6,067,369 A | 5/2000 | Kamei |
| 6,088,455 A | 7/2000 | Logan et al. |
| 6,092,040 A | 7/2000 | Voran |
| 6,096,961 A | 8/2000 | Bruti |
| 6,118,450 A | 9/2000 | Proehl et al. |
| 6,192,340 B1 | 2/2001 | Abecassis |
| 6,195,693 B1 | 2/2001 | Berry |
| 6,229,922 B1 | 5/2001 | Sasakawa et al. |
| 6,243,615 B1 | 6/2001 | Neway |
| 6,243,725 B1 | 6/2001 | Hempleman et al. |
| 6,253,193 B1 | 6/2001 | Ginter |
| 6,253,337 B1 | 6/2001 | Maloney et al. |
| 6,279,010 B1 | 8/2001 | Anderson |
| 6,279,124 B1 | 8/2001 | Brouwer et al. |
| 6,285,596 B1 | 9/2001 | Miura et al. |
| 6,330,593 B1 | 12/2001 | Roberts et al. |
| 6,345,256 B1 | 2/2002 | Milsted et al. |
| 6,374,260 B1 | 4/2002 | Hoffert et al. |
| 6,385,596 B1 | 5/2002 | Wiser |
| 6,418,421 B1 | 7/2002 | Hurtado et al. |
| 6,422,061 B1 | 7/2002 | Sunshine |
| 6,438,556 B1 | 8/2002 | Malik et al. |
| 6,449,226 B1 | 9/2002 | Kumagai |
| 6,452,874 B1 | 9/2002 | Otsuka et al. |
| 6,453,252 B1 | 9/2002 | Laroche |
| 6,460,050 B1 | 10/2002 | Pace et al. |
| 6,463,508 B1 | 10/2002 | Wolf et al. |
| 6,477,704 B1 | 11/2002 | Cremia |
| 6,487,641 B1 | 11/2002 | Cusson et al. |
| 6,490,279 B1 | 12/2002 | Chen et al. |
| 6,496,802 B1 | 12/2002 | van Zoest et al. |
| 6,526,411 B1 | 2/2003 | Ward |
| 6,542,869 B1 | 4/2003 | Foote |
| 6,550,001 B1 | 4/2003 | Corwin et al. |
| 6,550,011 B1 | 4/2003 | Sims, III |
| 6,552,254 B2 | 4/2003 | Hasegawa et al. |
| 6,591,245 B1 | 7/2003 | Klug |
| 6,609,093 B1 | 8/2003 | Gopinath et al. |
| 6,609,105 B2 | 8/2003 | van Zoest et al. |
| 6,628,737 B1 | 9/2003 | Timus |
| 6,636,965 B1 | 10/2003 | Beyda |
| 6,654,757 B1 | 11/2003 | Stern |
| 6,732,180 B1 | 5/2004 | Hale |
| 6,771,316 B1 | 8/2004 | Iggulden |
| 6,771,885 B1 | 8/2004 | Agnihotri et al. |
| 6,834,308 B1 | 12/2004 | Ikezoye |
| 6,947,909 B1 | 9/2005 | Hoke, Jr. |
| 6,968,337 B2 | 11/2005 | Wold |
| 7,043,536 B1 | 5/2006 | Philyaw |
| 7,047,241 B1 | 5/2006 | Erickson et al. |
| 7,058,223 B2 | 6/2006 | Cox et al. |
| 7,181,398 B2 | 2/2007 | Thong et al. |
| 7,266,645 B2 | 9/2007 | Garg et al. |
| 7,269,556 B2 * | 9/2007 | Kiss et al. ................. 704/245 |
| 7,281,272 B1 | 10/2007 | Rubin et al. |
| 7,289,643 B2 | 10/2007 | Brunk et al. |
| 7,349,552 B2 | 3/2008 | Levy et al. |
| 7,363,278 B2 | 4/2008 | Schmelzer et al. |
| 7,443,797 B2 | 10/2008 | Cheung et al. |
| 7,500,007 B2 | 3/2009 | Ikezoye et al. |
| 7,529,659 B2 | 5/2009 | Wold |
| 7,562,012 B1 | 7/2009 | Wold |
| 7,565,327 B2 | 7/2009 | Schmelzer |
| 7,593,576 B2 | 9/2009 | Meyer et al. |
| 2001/0013061 A1 | 8/2001 | DeMartin |
| 2001/0027493 A1 | 10/2001 | Wallace |
| 2001/0027522 A1 | 10/2001 | Saito |
| 2001/0034219 A1 | 10/2001 | Hewitt et al. |
| 2001/0037304 A1 | 11/2001 | Paiz |
| 2001/0056430 A1 | 12/2001 | Yankowski |
| 2002/0049760 A1 | 4/2002 | Scott |
| 2002/0064149 A1 | 5/2002 | Elliott et al. |
| 2002/0082999 A1 | 6/2002 | Lee |
| 2002/0087885 A1 | 7/2002 | Peled et al. |
| 2002/0120577 A1 | 8/2002 | Hans et al. |
| 2002/0123990 A1 | 9/2002 | Abe et al. |
| 2002/0129140 A1 | 9/2002 | Peled et al. |
| 2002/0133494 A1 | 9/2002 | Goedken |
| 2002/0141384 A1 | 10/2002 | Liu et al. |
| 2002/0152261 A1 | 10/2002 | Arkin et al. |
| 2002/0152262 A1 | 10/2002 | Arkin et al. |
| 2002/0156737 A1 | 10/2002 | Kahn |
| 2002/0158737 A1 | 10/2002 | Yokoyama |
| 2002/0186887 A1 | 12/2002 | Rhoads |
| 2002/0198789 A1 | 12/2002 | Waldman |
| 2003/0014530 A1 | 1/2003 | Bodin |
| 2003/0018709 A1 | 1/2003 | Schrempp et al. |
| 2003/0023852 A1 | 1/2003 | Wold |
| 2003/0033321 A1 | 2/2003 | Schrempp et al. |
| 2003/0037010 A1 | 2/2003 | Schmelzer et al. |
| 2003/0051100 A1 | 3/2003 | Patel |
| 2003/0061352 A1 | 3/2003 | Bohrer |
| 2003/0061490 A1 | 3/2003 | Abajian |
| 2003/0095660 A1 | 5/2003 | Lee et al. |
| 2003/0135623 A1 | 7/2003 | Schrempp et al. |
| 2003/0191719 A1 | 10/2003 | Ginter et al. |
| 2003/0195852 A1 | 10/2003 | Campbell et al. |
| 2004/0008864 A1 | 1/2004 | Watson et al. |
| 2004/0010495 A1 | 1/2004 | Kramer et al. |
| 2004/0053654 A1 | 3/2004 | Kokumai et al. |
| 2004/0073513 A1 | 4/2004 | Stefik et al. |
| 2004/0089142 A1 | 5/2004 | Georges et al. |
| 2004/0133797 A1 | 7/2004 | Arnold |
| 2004/0148191 A1 | 7/2004 | Hoke, Jr. |
| 2004/0163106 A1 | 8/2004 | Schrempp et al. |
| 2004/0167858 A1 | 8/2004 | Erickson |
| 2004/0201784 A9 | 10/2004 | Dagtas et al. |
| 2005/0021783 A1 | 1/2005 | Ishii |
| 2005/0039000 A1 | 2/2005 | Erickson |
| 2005/0044189 A1 | 2/2005 | Ikezoye et al. |
| 2005/0097059 A1 | 5/2005 | Shuster |
| 2005/0154678 A1 | 7/2005 | Schmelzer |
| 2005/0154680 A1 | 7/2005 | Schmelzer |
| 2005/0154681 A1 | 7/2005 | Schmelzer |
| 2005/0216433 A1 | 9/2005 | Bland et al. |
| 2005/0267945 A1 | 12/2005 | Cohen et al. |
| 2005/0289065 A1 | 12/2005 | Weare |
| 2006/0034177 A1 | 2/2006 | Schrempp |
| 2006/0062426 A1 | 3/2006 | Levy et al. |
| 2007/0074147 A1 | 3/2007 | Wold |
| 2007/0078769 A1 | 4/2007 | Way et al. |
| 2007/0186229 A1 | 8/2007 | Conklin et al. |
| 2007/0226365 A1 | 9/2007 | Hildreth et al. |

| | | | |
|---|---|---|---|
| 2008/0008173 | A1 | 1/2008 | Kanevsky et al. |
| 2008/0019371 | A1 | 1/2008 | Anschutz et al. |
| 2008/0133415 | A1 | 6/2008 | Ginter et al. |
| 2008/0141379 | A1 | 6/2008 | Schmelzer |
| 2008/0154730 | A1 | 6/2008 | Schmelzer |
| 2008/0155116 | A1 | 6/2008 | Schmelzer |
| 2009/0030651 | A1 | 1/2009 | Wold |
| 2009/0043870 | A1 | 2/2009 | Ikezoye et al. |
| 2009/0077673 | A1 | 3/2009 | Schmelzer |
| 2009/0089586 | A1 | 4/2009 | Brunk et al. |
| 2009/0240361 | A1 | 9/2009 | Wold et al. |
| 2009/0328236 | A1 | 12/2009 | Schmelzer |

FOREIGN PATENT DOCUMENTS

| | | | |
|---|---|---|---|
| EP | 0402210 | A1 | 6/1990 |
| EP | 0517405 | A2 | 5/1992 |
| EP | 0689316 | A2 | 12/1995 |
| EP | 0731446 | | 9/1996 |
| EP | 0859503 | | 8/1998 |
| EP | 0459046 | | 4/1999 |
| EP | 1354276 | B1 | 12/2007 |
| EP | 1485815 | B1 | 10/2009 |
| WO | WO 96/36163 | A3 | 11/1996 |
| WO | WO 98/20672 | A3 | 5/1998 |
| WO | WO 00/05650 | A1 | 2/2000 |
| WO | WO 00/39954 | A1 | 7/2000 |
| WO | WO 00/63800 | A1 | 10/2000 |
| WO | WO 01/23981 | A1 | 4/2001 |
| WO | WO 01/47179 | A1 | 6/2001 |
| WO | WO 01/52540 | A1 | 7/2001 |
| WO | WO 01/62004 | | 8/2001 |
| WO | WO 02/03203 | | 1/2002 |
| WO | WO 02/15035 | | 2/2002 |
| WO | WO 02/37316 | | 5/2002 |
| WO | WO 02/082271 | | 10/2002 |
| WO | WO 03/007235 | A1 | 1/2003 |
| WO | WO 03/009149 | A1 | 1/2003 |
| WO | WO 03/036496 | A1 | 5/2003 |
| WO | WO 03/067459 | A1 | 8/2003 |
| WO | WO 03/091990 | A1 | 11/2003 |
| WO | WO 2004/044820 | A1 | 5/2004 |
| WO | WO 2004/070558 | | 8/2004 |
| WO | WO 2006/015168 | | 2/2006 |
| WO | WO 2006/015168 | A2 | 2/2006 |
| WO | WO 2009/017710 | | 2/2009 |

OTHER PUBLICATIONS

Beritelli, F., et al., "Multilayer Chaotic Encryption for Secure Communications in packet switching Networks," IEEE, vol. 2Aug. 2000, pp. 1575-1582.
Blum, T., Keislar, D., Wheaton, J., and Wold, E., "Audio Databases with Content-Based Retrieval," Proceedings of the 1995 International Joint Conference on Artificial Intelligence (IJCAI) Workshop on Intelligent Multimedia Information Retrieval, 1995.
Breslin, Pat, et al., Relatable Website, "Emusic uses Relatable's open source audio recognition solution, TRM, to signature its music catabblog for MusicBrainz database," http://www.relatable.com/news/pressrelease/001017.release.html, Oct. 17, 2000.
Cosi, P., De Poli, G., Prandoni, P., "Timbre Characterization with Mel-Cepstrum and Neural Nets," Proceedings of the 1994 International Computer Music Conference, pp. 42-45, San Francisco, No date.
Dempster, A.P., et al., "Maximum Likelihood from Incomplete Data via the EM Algorithm" *Journal of the Royal Statistical Society, Series B (Methodological)*, vol. 39, Issue 1, pp. 31-38, 1977.
Feiten, B. and Gunzel, S., "Automatic Indexing of a Sound Database Using Self-Organizing Neural Nets," Computer Music Journal, 18:3, pp. 53-56, Fall 1994.
Fischer, S., Lienhart, R., and Effelsberg, W., "Automatic Recognition of Film Genres," Reihe Informatik, Jun. 1995, Universitat Mannheim, Praktische Informatik IV, L15, 16, D-68131 Mannheim.
Foote, J., "A Similarity Measure for Automatic Audio Classification," Institute of Systems Science, National University of Singapore, 1977, Singapore.
Haitsma, J., et al., "Robust Audio Hashing for Content Identification", CBMI 2001, Second International Workshop on Content Based Multimedia and Indexing, Brescia, Italy, Sep. 19-21, 2001.

Kanth, K.V. et al. "Dimensionality Reduction or Similarity Searching in Databases," Computer Vision and Image understanding, vol. 75, Nos. 1/2 Jul./Aug. 1999, pp. 59-72, Academic Press, Santa Barbara, CA, USA.
Keislar, D., Blum, T., Wheaton, J., and Wold, E., "Audio Analysis for Content-Based Retrieval" Proceedings of the 1995 International Computer Music Conference.
Ohtsuki, K., et al. , "Topic extraction based on continuous speech recognition in broadcast-news speech," Proceedings IEEE Workshop on Automated Speech Recognition and Understanding, 1997, pp. 527-534, N.Y., N.Y., USA.
Packethound Tech Specs, www.palisdesys.com/products/packethount/tck specs/prodPhtechspecs.shtml, 2002.
"How does PacketHound work?", www.palisdesys.com/products/packethound/how_does_it_work/prod_Pghhow.shtml 2002.
Pellom, B. et al., "Fast Likelihood Computation Techniques in Nearest-Neighbor search for Continuous Speech Recognition.", *IEEE Signal Processing Letters*, vol. 8, pp. 221-224 Aug. 2001.
Reynolds, D., et al. , "Robust Text-Independent Speaker Identification Using Gaussian Mixture Speaker Models", *IEEE Transactions on Speech and Audio Processing*, vol. 3, No. 1, pp. 72-83 Jan. 1995.
Scheirer, E., Slaney, M., "Construction and Evaluation of a Robust Multifeature Speech/Music Discriminator," pp. 1-4, Proceedings of ICASSP-97, Apr. 2-24, Munich, Germany.
Scheirer, E.D., "Tempo and Beat Analysis of Acoustic Musical Signals," Machine Listening Group, E15-401D MIT Media Laboratory, pp. 1-21, Aug. 8, 1997, Cambridge, MA.
Schneier, Bruce, Applied Cryptography, Protocols, Algorithms and Source Code in C, Chapter 2 Protocol Building Blocks, 1996, pp. 30-31.
Smith, Alan J., "Cache Memories," Computer Surveys, Sep. 1982, University of California, Berkeley, California, vol. 14, No. 3, pp. 1-61.
Vertegaal, R. and Bonis, E., "ISEE: An Intuitive Sound Editing Environment," Computer Music Journal, 18:2, pp. 21-22, Summer 1994.
Wang, Yao, et al., "Multimedia Content Analysis," IEEE Signal Processing Magazine, pp. 12-36, Nov. 2000, IEEE Service Center, Piscataway, N.J., USA.
Wold, Erling, et al., "Content Based Classification, Search and Retrieval of Audio," IEEE Multimedia, vol. 3, No. 3, pp. 27-36, 1996 IEEE Service Center, Piscataway, N.J., USA.
Zawodny, Jeremy, D., "A C Program to Compute CDDB discids on Linus and FreeBSD," [internet] http://jeremy.zawodny.com/c/discid-linux-1.3tar.gz, 1 page, Apr. 14, 2001, retrieved Jul. 17, 2007.
European Patent Application No. 02752347.1, Supplementary European Search Report Dated May 8, 2006, 4 pages.
European Patent Application No. 02756525.8, Supplementary European Search Report Dated Jun. 28, 2006, 4 pages.
European Patent Application No. 02782170, Supplementary European Search Report Dated Feb. 7, 2007, 4 pages.
European Patent Application No. 02725522.3, Supplementary European Search Report Dated May 12, 2006, 2 Pages.
PCT Search Report PCT/US01/50295, International Search Report dated May 14, 2003, 5 Pages.
PCT Search Report PCT/US02/10615, International Search Report dated Aug. 7, 2002, 2 Pages.
PCT Search Report PCT/US02/33186, International Search Report dated Dec. 16, 2002, pp. 1-4.
PCT Search Report PCT/US04/02748, International Search Report and Written Opinion dated Aug. 20, 2007, 6 Pages.
PCT Search Report PCT/US05/26887, International Search Report dated May 3, 2006, 2 Pages.
PCT Search Report PCT/US08/09127, International Search Report dated Oct. 30, 2008, 8 Pages.
Audible Magic Office Action for U.S. Appl. No. 09/511,632 mailed Dec. 4, 2002.
Audible Magic Office Action for U.S. Appl. No. 09/511,632 mailed May 13, 2003.
Audible Magic Office Action for U.S. Appl. No. 09/511,632 mailed Aug. 27, 2003.
Audible Magic Office Action for U.S. Appl. No. 09/511,632 mailed Feb. 5, 2004.

Audible Magic Notice of Allowance for U.S. Appl. No. 09/511,632 mailed Aug. 10, 2004.
Audible Magic Notice of Allowance for U.S. Appl. No. 10/955,841 mailed Sep. 25, 2006.
Audible Magic Notice of Allowance for U.S. Appl. No. 10/955,841 mailed Mar. 23, 2007.
Audible Magic Notice of Allowance for U.S. Appl. No. 10/955,841 mailed Sep. 11, 2007.
Audible Magic Notice of Allowance for U.S. Appl. No. 10/955,841 mailed Feb. 25, 2008.
Audible Magic Office Action for U.S. Appl. No. 08/897,662 mailed Aug. 13, 1998.
Audible Magic Notice of Allowance for U.S. Appl. No. 08/897,662 mailed Jan. 29, 1999.
Audible Magic Office Action for U.S. Appl. No. 09/706,227 mailed May 5, 2004.
Audible Magic Office Action for U.S. Appl. No. 09/706,227 mailed Nov. 12, 2004.
Audible Magic Office Action for U.S. Appl. No. 09/706,227 mailed May 9, 2005.
Audible Magic Office Action for U.S. Appl. No. 09/706,227 mailed Nov. 1, 2005
Audible Magic Office Action for U.S. Appl. No. 09/706,227 mailed Jun. 23, 2006.
Audible Magic Office Action for U.S. Appl. No. 09/706,227 mailed Nov. 7, 2006.
Audible Magic Office Action for U.S. Appl. No. 09/706,227 mailed Mar. 29, 2007.
Audible Magic Office Action for U.S. Appl. No. 09/706,227 mailed Sep. 17, 2007.
Audible Magic Office Action for U.S. Appl. No. 09/706,227 mailed May 29, 2008.
Audible Magic Office Action for U.S. Appl. No. 09/706,227 mailed Jan. 9, 2009.
Audible Magic Office Action for U.S. Appl. No. 10/192,783 mailed Dec. 13, 2004.
Audible Magic Notice of Allowance for U.S. Appl. No. 10/192,783 mailed Jun. 7, 2005.
Audible Magic Notice of Allowance for U.S. Appl. No. 11/239,543 mailed Apr. 23, 2008.
Audible Magic Notice of Allowance for U.S. Appl. No. 11/239,543 mailed Feb. 25, 2008.
Audible Magic Office Action for U.S. Appl. No. 09/910,680 mailed Nov. 17, 2004.
Audible Magic Office Action for U.S. Appl. No. 09/910,680 mailed May 16, 2005.
Audible Magic Office Action for U.S. Appl. No. 09/910,680 mailed Sep. 29, 2005.
Audible Magic Office Action for U.S. Appl. No. 09/910,680 mailed Jun. 23, 2006.
Audible Magic Office Action for U.S. Appl. No. 09/910,680 mailed Aug. 8, 2006.
Audible Magic Office Action for U.S. Appl. No. 09/910,680 mailed Jan. 25, 2007.
Audible Magic Office Action for U.S. Appl. No. 09/910,680 mailed Dec. 5, 2007.
Audible Magic Office Action for U.S. Appl. No. 09/999,763 mailed Apr. 6, 2005.
Audible Magic Office Action for U.S. Appl. No. 09/999,763 mailed Oct. 6, 2005.
Audible Magic Office Action for U.S. Appl. No. 09/999,763 mailed Apr. 7, 2006.
Audible Magic Office Action for U.S. Appl. No. 09/999,763 mailed Oct. 6, 2006.
Audible Magic Office Action for U.S. Appl. No. 09/999,763 mailed Mar. 7, 2007.
Audible Magic Office Action for U.S. Appl. No. 09/999,763 mailed Aug. 20, 2007.
Audible Magic Office Action for U.S. Appl. No. 09/999,763 mailed Jan. 7, 2008.
Audible Magic Office Action for U.S. Appl. No. 09/999,763 mailed Jun. 27, 2008.
Audible Magic Office Action for U.S. Appl. No. 09/999,763 mailed Dec. 22, 2008.
Audible Magic Office Action for U.S. Appl. No. 10/072,238 mailed May 3, 2005.
Audible Magic Office Action for U.S. Appl. No. 10/072,238 mailed Oct. 25, 2005.
Audible Magic Office Action for U.S. Appl. No. 10/072,238 mailed Apr. 25, 2006.
Audible Magic Office Action for U.S. Appl. No. 10/072,238 mailed Sep. 19, 2007.
Audible Magic Office Action for U.S. Appl. No. 10/072,238 mailed Apr. 7, 2008.
Audible Magic Office Action for U.S. Appl. No. 10/072,238 mailed Oct. 1, 2008.
Audible Magic Office Action for U.S. Appl. No. 11/116,710 mailed Dec. 13, 2004.
Audible Magic Office Action for U.S. Appl. No. 11/116,710 mailed Apr. 8, 2005.
Audible Magic Office Action for U.S. Appl. No. 11/116,710 mailed Oct. 7, 2005.
Audible Magic Office Action for U.S. Appl. No. 11/116,710 mailed Apr. 20, 2006.
Audible Magic Office Action for U.S. Appl. No. 11/116,710 mailed Jul. 31, 2006.
Audible Magic Office Action for U.S. Appl. No. 11/116,710 mailed Jan. 16, 2007.
Audible Magic Notice of Allowance for U.S. Appl. No. 11/116,710 mailed Nov. 19, 2007.
Audible Magic Notice of Allowance for U.S. Appl. No. 12/042,023 mailed Dec. 29, 2008.
Audible Magic Office Action for U.S. Appl. No. 11/048,307 mailed Aug. 22, 2007.
Audible Magic Office Action for U.S. Appl. No. 11/048,307 mailed May 16, 2008.
Audible Magic Office Action for U.S. Appl. No. 11/048,308 mailed Feb. 25, 2008.
Audible Magic Office Action for U.S. Appl. No. 11/048,308 mailed Mar. 5, 2009.
Audible Magic Office Action for U.S. Appl. No. 11/048,338 mailed Apr. 18, 2007.
Audible Magic Office Action for U.S. Appl. No. 11/048,338 mailed Oct. 11, 2007.
Audible Magic Office Action for U.S. Appl. No. 11/048,338 mailed Jan. 14, 2008.
Audible Magic Office Action for U.S. Appl. No. 11/048,338 mailed Jul. 9, 2008.
Audible Magic Office Action for U.S. Appl. No. 11/048,338 mailed Jan. 7, 2009.
Audible Magic Office Action for U.S. Appl. No. 12/035,599 mailed Nov. 17, 2008.
Audible Magic Office Action for U.S. Appl. No. 12/035,609 mailed Dec. 29, 2008.
Audible Magic Office Action for U.S. Appl. No. 10/356,318 mailed May 24, 2006.
Audible Magic Office Action for U.S. Appl. No. 10/356,318 mailed Nov. 2, 2006.
Audible Magic Office Action for U.S. Appl. No. 10/356,318 mailed Apr. 11, 2007.
Audible Magic Office Action for U.S. Appl. No. 10/356,318 mailed Nov. 1, 2007.
Audible Magic Office Action for U.S. Appl. No. 10/356,318 mailed May 9, 2008.
Audible Magic Office Action for U.S. Appl. No. 10/356,318 mailed Jan. 6, 2009.
Audible Magic Office Action for U.S. Appl. No. 11/191,493 mailed Jul. 17, 2008.
Audible Magic Office Action for U.S. Appl. No. 11/191,493 mailed Jan. 9, 2009.
Business Wire, "Cisco and Fox Host Groundbreaking Screening of Titan A.E.; Animated Epic Will Be First Film Ever to be Digitaly Transmitted Over the Internet Monday," Jun. 5, 2000, 08:14 EDT.

Business Wire, "IBM: IBM Announces New Descrambler Software; First to Offer Software to Work With Digital Video Chips," Jun. 5, 25, 1997, 07:49.

Chen, et al., Yong-Cong, A Secure and Robust Digital Watermaking Technique by the Blcok Cipher RC6 and Secure Hash Algorithm, Deparment of Computer Science, National Tsing Hua University, 2001.

Gasaway Laura, Close of Century Sees New Copyright Amendments, Mar. 2000, Information Outlook, 4, 3, 42.

Harris, Lesley Ellen, "To register or not," Mar. 2006, Information Outlook, 10, 3, 32(s).

Pankanti, Sharath, "Verification Watermarks on Fingerprint Recognition and Retrieval," Part of IS&T/SPIE Conference on Security and Watermarking of Multimedia Contents, San Jose, CA Jan. 1999, SPIE vol. 3657, pp. 66-78.

European Patent Application No. 04706547.9 European Search Report Dated Feb. 25, 2010, 3 Pages.

Audible Magic Notice of Allowance for U.S. Appl. No. 12/251,404 mailed May 14, 2010.

Audible Magic Office Action for U.S. Appl. No. 11/239,543 mailed Apr. 23, 2008.

Audible Magic Notice of Allowance for U.S. Appl. No. 11/239,543 mailed Nov. 6, 2008.

Audible Magic Notice of Allowance for U.S. Appl. No. 11/239,543 mailed Feb. 25, 2009.

Audible Magic Office Action for U.S. Appl. No. 09/999,763 mailed Jul. 20, 2009.

Audible Magic Office Action for U.S. Appl. No. 09/999,763 mailed Dec. 21, 2009.

Audible Magic Office Action for U.S. Appl. No. 09/999,763 mailed Jun. 23, 2010.

Audible Magic Office Action for U.S. Appl. No. 10/072,238 mailed Jan. 9, 2009.

Audible Magic Office Action for U.S. Appl. No. 10/072,238 mailed Mar. 31, 2009.

Audible Magic Office Action for U.S. Appl. No. 10/072,238 mailed Aug. 6, 2010.

Audible Magic Notice of Allowance for U.S. Appl. No. 12/042,023 mailed Jun. 25, 2009.

Audible Magic Notice of Allowance for U.S. Appl. No. 12/042,023 mailed Mar. 8, 2010.

Audible Magic Notice of Allowance for U.S. Appl. No. 11/048,307 mailed May 29, 2009.

Audible Magic Notice of Allowance for U.S. Appl. No. 11/048,308 mailed Aug. 7, 2009.

Audible Magic Office Action for U.S. Appl. No. 11/048,338 mailed Jul. 6, 2009.

Audible Magic Office Action for U.S. Appl. No. 11/048,338 mailed Dec. 28, 2009.

Audible Magic Office Action for U.S. Appl. No. 11/048,338 mailed Jun. 24, 2010.

Audible Magic Office Action for U.S. Appl. No. 12/035,599 mailed May 29, 2009.

Audible Magic Office Action for U.S. Appl. No. 12/035,599 mailed Nov. 24, 2009.

Audible Magic Office Action for U.S. Appl. No. 12/035,599 mailed Jun. 9, 2010.

Audible Magic Office Action for U.S. Appl. No. 12/035,609 mailed Jun. 24, 2009.

Audible Magic Notice of Allowance for U.S. Appl. No. 12/035,609 mailed Dec. 11, 2009.

Audible Magic Notice of Allowance for U.S. Appl. No. 12/277,291 mailed May 12, 2010.

Audible Magic Office Action for U.S. Appl. No. 10/356,318 mailed Jun. 15, 2009.

Audible Magic Office Action for U.S. Appl. No. 10/356,318 mailed Jan. 21, 2010.

Audible Magic Office Action for U.S. Appl. No. 11/191,493 mailed Apr. 28, 2009.

Audible Magic Office Action for U.S. Appl. No. 11/191,493 mailed Nov. 19, 2009.

Audible Magic Office Action for U.S. Appl. No. 11/191,493 mailed May 25, 2010.

European Patent Application No. 05778109.8 European Search Report Dated Sep. 10, 2010, 7 Pages.

Audible Magic Notice of Allowance for U.S. Appl. No. 10/072,238 mailed May 3, 2005.

Audible Magic Corporation, "Audio Identification Technology Provides The Cornerstone for Online Distribution," 2000, http://www.audiblemagic.com/documents/Technology_Summary.pdf.

European Patent Application No. 05778109.8 European Search Report Dated Sep. 10, 2010, 7 Pages (5219P009EP).

Audible Magic Office Action for U.S. Appl. No. 12/482,313 mailed Feb. 4, 2011.

Audible Magic Notice of Allowance for U.S. Appl. No. 09/999,763 mailed Sep. 16, 2010.

Audible Magic Office Action for U.S. Appl. No. 12/488,504 mailed Nov. 10, 2010.

Audible Magic Office Action for U.S. Appl. No. 10/356,318 mailed Jan. 7, 2011.

Audible Magic Office Action for U.S. Appl. No. 11/191,493 mailed Oct. 4, 2010.

Audible Magic Office Action for U.S. Appl. No. 11/829,662 mailed Oct. 8, 2010.

Audible Magic Office Action for U.S. Appl. No. 11/923,491 mailed Nov. 12, 2010.

Audible Magic Office Action for U.S. Appl. No. 12/405,174 mailed Mar. 2, 2011.

* cited by examiner

METHOD AND APPARATUS FOR IDENTIFYING AN UNKNOWN WORK

PRIORITY CLAIM

This application is a continuation of U.S. patent application Ser. No. 11/239,543, filed Sep. 28, 2005 now U.S. Pat. No. 7,529,659, which is a continuation of U.S. patent application Ser. No. 10/192,783, filed Jul. 9, 2002 now U.S. Pat. No. 6,968,337, which claims the benefit of U.S. Provisional Patent application Ser. No. 60/304,647, filed Jul. 10, 2001, which are hereby incorporated by reference.

BACKGROUND OF THE INVENTION

Field of the Invention

The present invention relates to data communications. In particular, the present invention relates to a novel method and apparatus for identifying an unknown work.

THE PRIOR ART

Background

Digital audio technology has greatly changed the landscape of music and entertainment. Rapid increases in computing power coupled with decreases in cost have made it possible for individuals to generate finished products having a quality once available only in a major studio. One consequence of modern technology is that legacy media storage standards, such as reel-to-reel tapes, are being rapidly replaced by digital storage media, such as the Digital Versatile Disk (DVD), and Digital Audio Tape (DAT). Additionally, with higher capacity hard drives standard on most personal computers, home users may now store digital files such as audio or video tracks on their home computers.

Furthermore, the Internet has generated much excitement, particularly among those who see the Internet as an opportunity to develop new avenues for artistic expression and communication. The Internet has become a virtual gallery, where artists may post their works on a Web page. Once posted, the works may be viewed by anyone having access to the Internet.

One application of the Internet that has received considerable attention is the ability to transmit recorded music over the Internet. Once music has been digitally encoded, the audio may be both downloaded by users for play, or broadcast ("streamed") over the Internet. When audio is streamed, it may be listened to by Internet users in a manner much like traditional radio stations.

Given the widespread use of digital media, digital audio files, or digital video files containing audio information, may need to be identified. The need for identification of digital files may arise in a variety of situations. For example, an artist may wish to verify royalty payments or generate their own Arbitron®-like ratings by identifying how often their works are being streamed or downloaded. Additionally, users may wish to identify a particular work. The prior art has made efforts to create methods for identifying digital audio works.

However, systems of the prior art suffer from certain disadvantages. One area of difficulty arises when a large number of reference signatures must be compared to an unknown audio recording.

The simplest method for comparing an incoming audio signature (which could be from a file on the Internet, a recording of a radio or Internet radio broadcast, a recording from a cell phone, etc) to a database of reference signatures for the purpose of identification is to simply compare the incoming signature to every element of the database. However, since it may not be known where the reference signatures might have occurred inside the incoming signature, this comparison must be done at many time locations within the incoming signature. Each individual signature-to-signature comparison at each point in time may also be done in a "brute-force" manner using techniques known in the art; essentially computing the full Euclidean distance between the entire signatures' feature vectors. A match can then be declared when one of these comparisons yields a score or distance that is above or below some threshold, respectively.

However, when an audio signature or fingerprint contains a large number of features such a brute-force search becomes too expensive computationally for real-world databases which typically have several hundred thousand to several million signatures.

Many researchers have worked on methods for multi-dimensional indexing, although the greatest effort has gone into geographical (2-dimensional) or spatial (3-dimensional) data. Typically, all of these methods order the elements of the database based on their proximity to each other.

For example, the elements of the database can be clustered into hyper-spheres or hyper-rectangles, or the space can be organized into a tree form by using partitioning planes. However, when the number of dimensions is large (on the order of 15 or more), it can be shown mathematically that more-or-less uniformly distributed points in the space all become approximately equidistant from each other. Thus, it becomes impossible to cluster the data in a meaningful way, and comparisons can become both lengthy and inaccurate.

Hence, there exists a need to provide a means for data comparison which overcomes the disadvantages of the prior art.

BRIEF DESCRIPTION OF THE INVENTION

A method and apparatus for identifying an unknown work is disclosed. In one aspect a method may includes the acts of providing a reference database having a reduced dimensionality containing signatures of sampled works; receiving a sampled work; producing a signature from the work; and reducing the dimensionality of the signature.

BRIEF DESCRIPTION OF THE DRAWING FIGURES

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

It is contemplated that the present invention may be embodied in various computer and machine-readable data structures. Furthermore, it is contemplated that data structures embodying the present invention will be transmitted across computer and machine-readable media, and through communications systems by use of standard protocols such as those used to enable the Internet and other computer networking standards.

The invention further relates to machine-readable media on which are stored embodiments of the present invention. It is contemplated that any media suitable for storing instructions related to the present invention is within the scope of the present invention. By way of example, such media may take the form of magnetic, optical, or semiconductor media.

The present invention may be described through the use of flowcharts. Often, a single instance of an embodiment of the present invention will be shown. As is appreciated by those of ordinary skill in the art, however, the protocols, processes, and procedures described herein may be repeated continuously or as often as necessary to satisfy the needs described herein. Accordingly, the representation of the present invention through the use of flowcharts should not be used to limit the scope of the present invention.

The present invention may also be described through the use of web pages in which embodiments of the present invention may be viewed and manipulated. It is contemplated that such web pages may be programmed with web page creation programs using languages standard in the art such as HTML or XML. It is also contemplated that the web pages described herein may be viewed and manipulated with web browsers running on operating systems standard in the art, such as the Microsoft Windows® and Macintosh® versions of Internet Explorer® and Netscape®. Furthermore, it is contemplated that the functions performed by the various web pages described herein may be implemented through the use of standard programming languages such a Java® or similar languages.

The present invention will first be described in general overview. Then, each element will be described in further detail below.

Figure 1A:
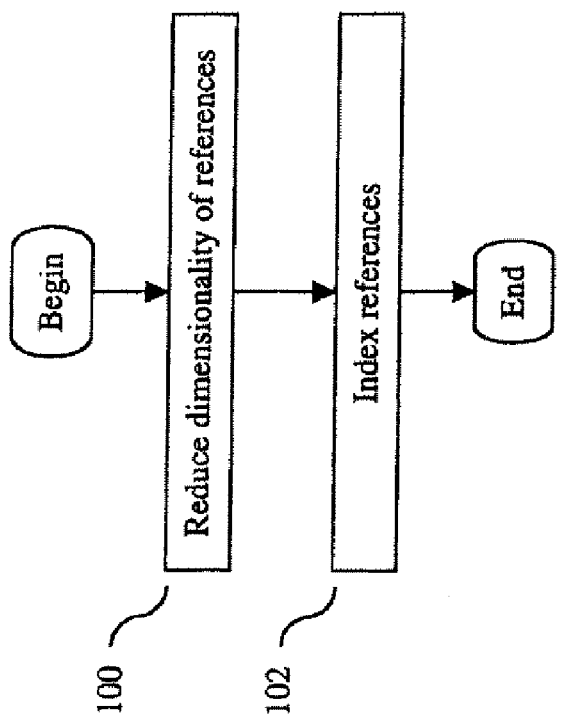
FIG. 1A is a flowchart of a method according to the present invention.

Referring now to FIG. 1A, a flowchart is shown which provides a general overview of the present invention as related to the preparation of a database of reference signatures. Two overall acts are performed to prepare a reference database in accordance with the present invention: in act 100, the present invention reduces the dimensionality of reference signatures; and the reference database is indexed in act 102.

Figure 1B:
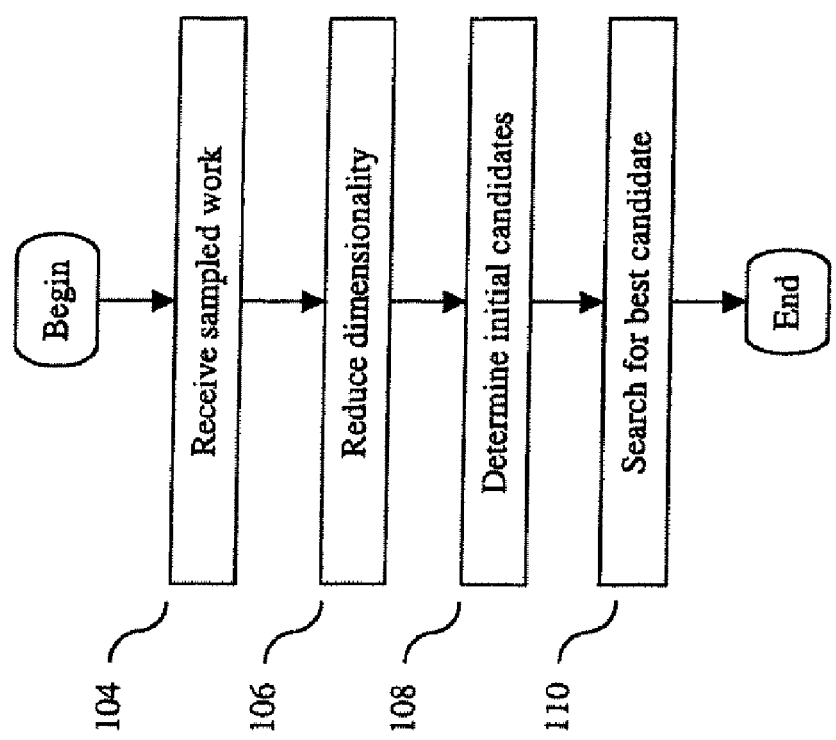
FIG. 1B is a flowchart of another method according to the present invention.

Referring now to FIG. 1B, a flowchart is shown which provides a general overview of the present invention as related to the identification of an unknown signature in accordance with the present invention. In act 104, a sampled work is received. In act 106, the present invention reduces the dimensionality of the received work. In act 108, the present invention determines initial candidates. In act 110, the present invention searches for the best candidate.

Prior to presenting a detailed overview of each act of FIGS. 1A and 11B, some background will first be presented.

Structural Embodiment of the Present Invention

Figure 2:
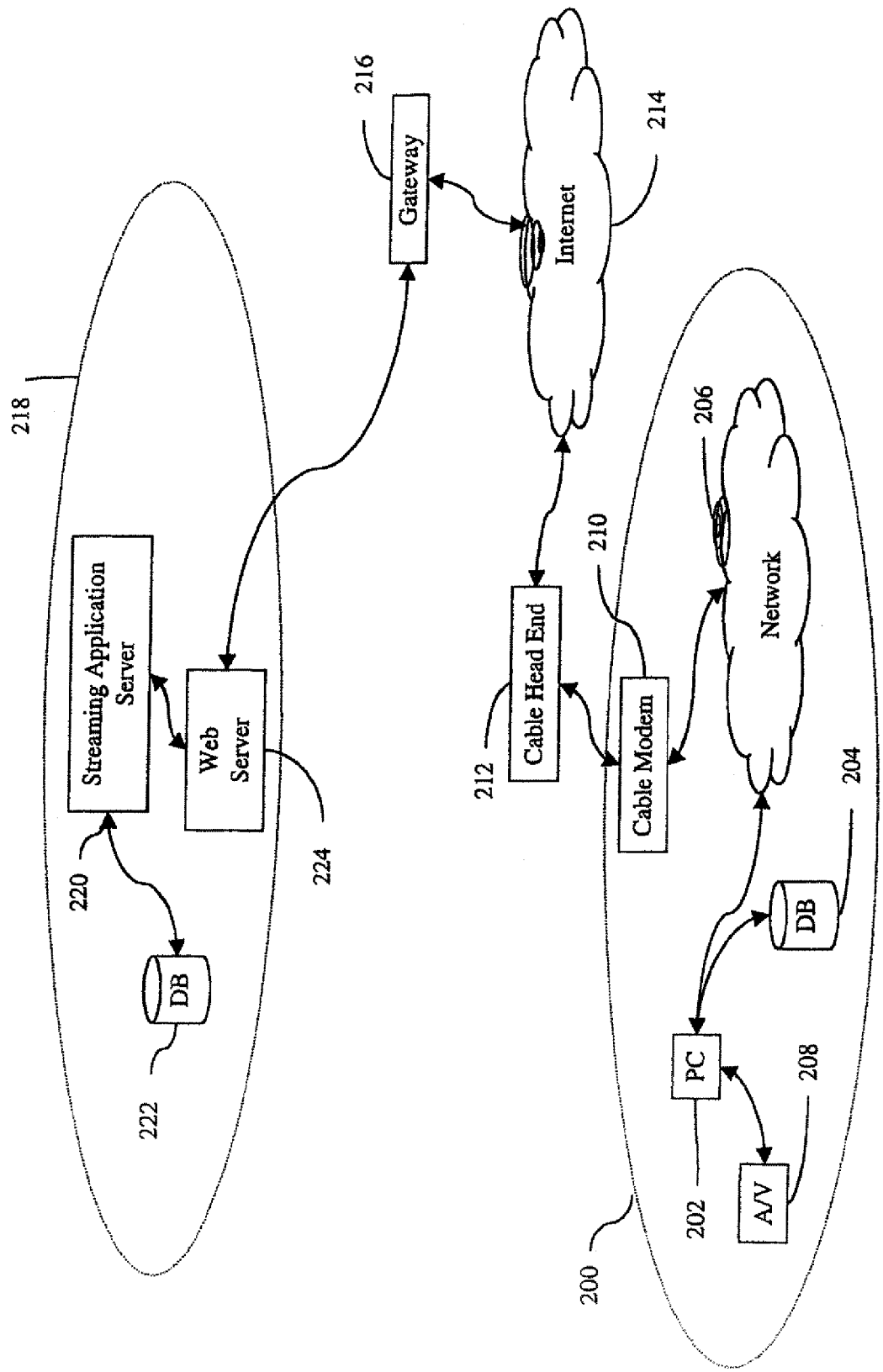
FIG. 2 is a diagram of a system suitable for use with the present invention.

Referring now to FIG. 2, a diagram of a system suitable for use with the present invention is shown. FIG. 2 includes a client system 200. It is contemplated that client system 200 may comprise a personal computer 202 including hardware and software standard in the art to run an operating system such as Microsoft Windows®, MAC OS® Palm OS, UNIX, or other operating systems standard in the art. Client system 200 may further include a database 204 for storing and retrieving embodiments of the present invention. It is contemplated that database 204 may comprise hardware and software standard in the art and may be operatively coupled to PC 202. Database 204 may also be used to store and retrieve the works and segments utilized by the present invention.

Client system 200 may further include an audio/video (A/V) input device 208. A/V device 208 is operatively coupled to PC 202 and is configured to provide works to the present invention which may be stored in traditional audio or video formats. It is contemplated that A/V device 208 may comprise hardware and software standard in the art configured to receive and sample audio works (including video containing audio information), and provide the sampled works to the present invention as digital audio files. Typically, the A/V input device 208 would supply raw audio samples in a format such as 16-bit stereo PCM format. A/V input device 208 provides an example of means for receiving a sampled work.

It is contemplated that sampled works may be obtained over the Internet, also. Typically, streaming media over the Internet is provided by a provider, such as provider 218 of FIG. 2. Provider 218 includes a streaming application server 220, configured to retrieve works from database 222 and stream the works in a formats standard in the art, such as Real®, Windows Media®, or QuickTime®. The server then provides the streamed works to a web server 224, which then provides the streamed work to the Internet 214 through a gateway 216. Internet 214 may be any packet-based network standard in the art, such as IP, Frame Relay, or ATM.

To reach the provider 218, the present invention may utilize a cable or DSL head end 212 standard in the art operatively, which is coupled to a cable modem or DSL modem 210 which is in turn coupled to the system's network 206. The network 206 may be any network standard in the art, such as a LAN provided by a PC 202 configured to run software standard in the art.

It is contemplated that the sampled work received by system 200 may contain audio information from a variety of sources known in the art, including, without limitation, radio, the audio portion of a television broadcast, Internet radio, the audio portion of an Internet video program or channel, streaming audio from a network audio server, audio delivered to personal digital assistants over cellular or wireless communication systems, or cable and satellite broadcasts.

Additionally, it is contemplated that the present invention may be configured to receive and compare segments coming from a variety of sources either stored or in real-time. For example, it is contemplated that the present invention may compare a real-time streaming work coming from streaming server 218 or A/V device 208 with a reference segment stored in database 204.

Segmenting Background

It is contemplated that a wide variety of sampled works may be utilized in the present invention. However, the inventors have found the present invention especially useful with segmented works. An overview of a segmented work will now be provided.

Figure 3:
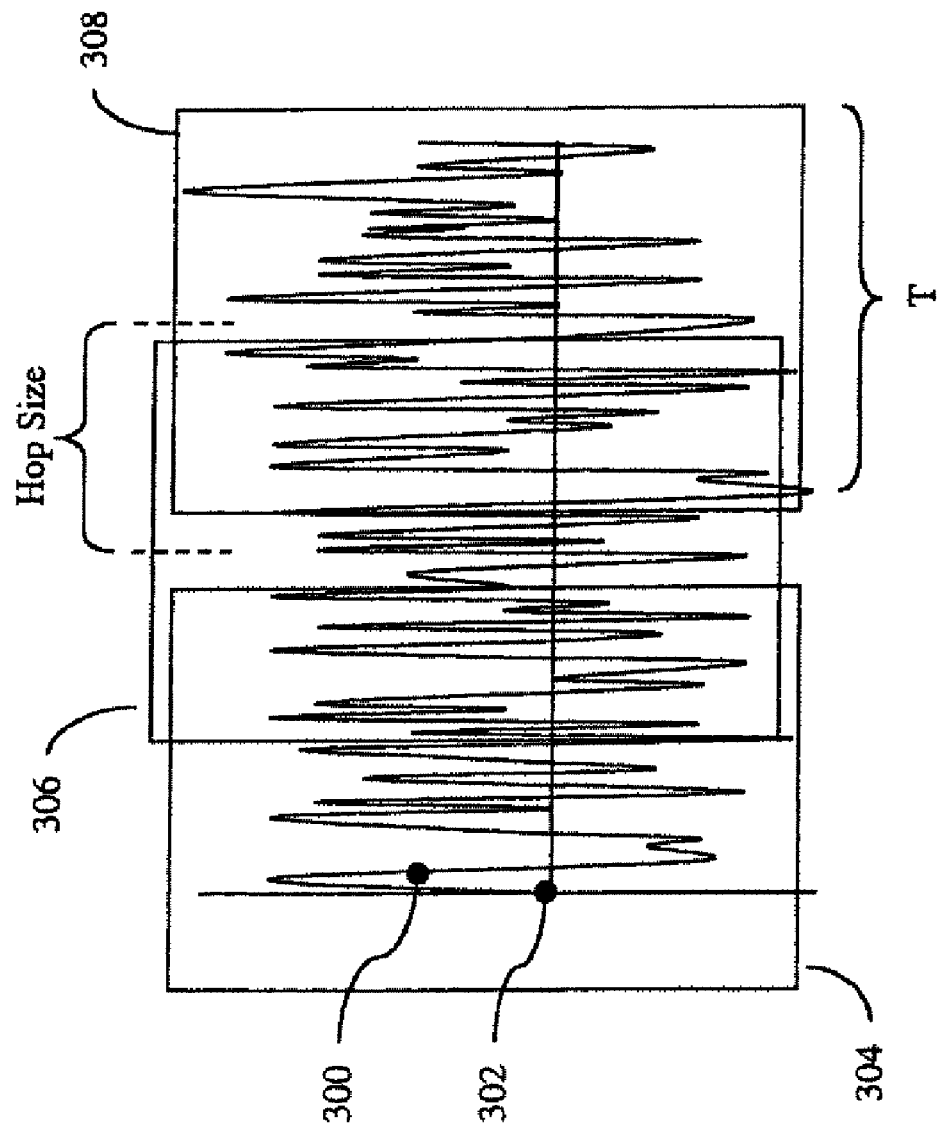
FIG. 3 is a diagram of segmenting according to the present invention.

FIG. 3 shows a diagram showing the segmenting of a work according to the present invention. FIG. 3 includes audio information 300 displayed along a time axis 302. FIG. 3 further includes a plurality of segments 304, 306, and 308 taken of audio information 300 over some segment size T.

In an exemplary non-limiting embodiment of the present invention, instantaneous values of a variety of acoustic features are computed at a low level, preferably about 100 times a second. In particular, 10 MFCCs (cepstral coefficients) are computed. It is contemplated that any number of MFCCs may be computed. Preferably, 5-20 MFCCs are computed, however, as many as 30 MFCCs may be computed, depending on the need for accuracy versus speed.

Segment-level features are disclosed U.S. Pat. No. 5,918,223 to Blum, et al., which is assigned to the assignee of the current disclosure and incorporated by reference as though fully set forth herein. In an exemplary non-limiting embodiment of the present invention, the segment-level acoustical features comprise statistical measures as disclosed in the '223 patent of low-level features calculated over the length of each segment. The data structure may store other bookkeeping information as well (segment size, hop size, item ID, UPC, etc). As can be seen by inspection of FIG. 3, the segments 304, 306, and 308 may overlap in time. This amount of overlap may be represented by measuring the time between the center point of adjacent segments. This amount of time is referred to herein as the hop size of the segments, and is so designated in FIG. 3. By way of example, if the segment length T of a given segment is one second, and adjacent segments overlap by 50%, the hop size would be 0.5 second.

The hop size may be set during the development of the software. Additionally, the hop sizes of the reference database and the real-time signatures may be predetermined to facilitate compatibility. For example, the reference signatures in the reference database may be precomputed with a fixed hop and segment size, and thus the client applications should conform to this segment size and have a hop size which integrally divides the reference signature hop size. It is contemplated that one may experiment with a variety of segment sizes in order to balance the tradeoff of accuracy with speed of computation for a given application.

The inventors have found that by carefully choosing the hop size of the segments, the accuracy of the identification process may be significantly increased. Additionally, the inventors have found that the accuracy of the identification process may be increased if the hop size of reference segments and the hop size of segments obtained in real-time are each chosen independently. The importance of the hop size of segments may be illustrated by examining the process for segmenting pre-recorded works and real-time works separately.

Reference Signatures

Prior to attempting to identify a given work, a reference database of signatures must be created. When building a reference database, a segment length having a period of less than three seconds is preferred. In an exemplary non-limiting embodiment of the present invention, the segment lengths have a period ranging from 0.5 seconds to 3 seconds. For a reference database, the inventors have found that a hop size of approximately 50% to 100% of the segment size is preferred.

It is contemplated that the reference signatures may be stored on a database such as database 204 as described above. Database 204 and the discussion herein provide an example of means for providing a plurality of reference signatures each having a segment size and a hop size.

Unknown Signatures

The choice of the hop size is important for the signatures of the audio to be identified, hereafter referred to as "unknown audio."

Figure 4:
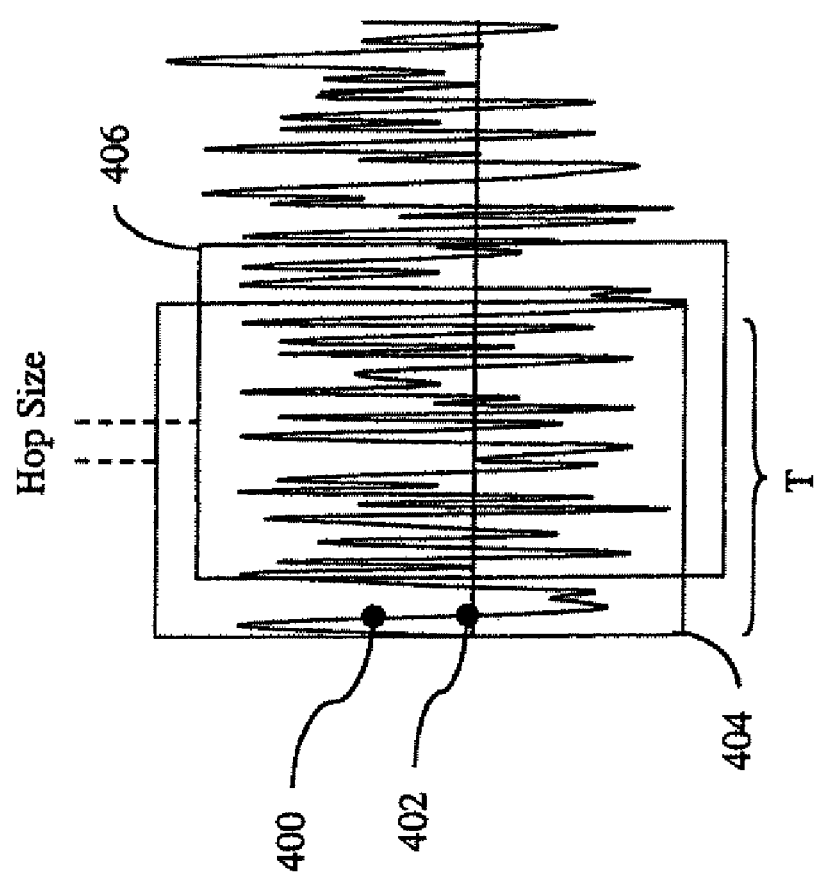
FIG. 4 is a detailed diagram of segmenting according to the present invention showing hop size.

FIG. 4 shows a detailed diagram of the segmentation of unknown audio according to the present invention. FIG. 4 includes unknown audio information 400 displayed along a time axis 402. FIG. 4 further includes segments 404 and 406 taken of audio information 400 over some segment length T. In an exemplary non-limiting embodiment of the present invention, the segment length of unknown audio segments is chosen to range from 0.5 to 3 seconds.

As can be seen by inspection of FIG. 4, the hop size of unknown audio segments is chosen to be smaller than that of reference segments. In an exemplary non-limiting embodiment of the present invention, the hop size of unknown audio segments is less than 50% of the segment size. In yet another exemplary non-limiting embodiment of the present invention, the unknown audio hop size may be 0.1 seconds.

The inventors have found such a small hop size advantageous for the following reasons. The ultimate purpose of generating unknown audio segments is to analyze and compare them with the reference segments in the database to look for matches. The inventors have found at least two major reasons why an unknown audio recording would not match its counterpart in the database. One is that the broadcast channel does not produce a perfect copy of the original. For example, the work may be edited or processed or the announcer may talk over part of the work. The other reason is that larger segment boundaries may not line up in time with the original segment boundaries of the target recordings.

The inventors have found that by choosing a smaller hop size, some of the segments will ultimately have time boundaries that line up with the original segments, notwithstanding the problems listed above. The segments that line up with a "clean" segment of the work may then be used to make an accurate comparison while those that do not so line up may be ignored. The inventors have found that a hop size of 0.1 seconds seems to be the maximum that would solve this time shifting problem.

Figure 5:
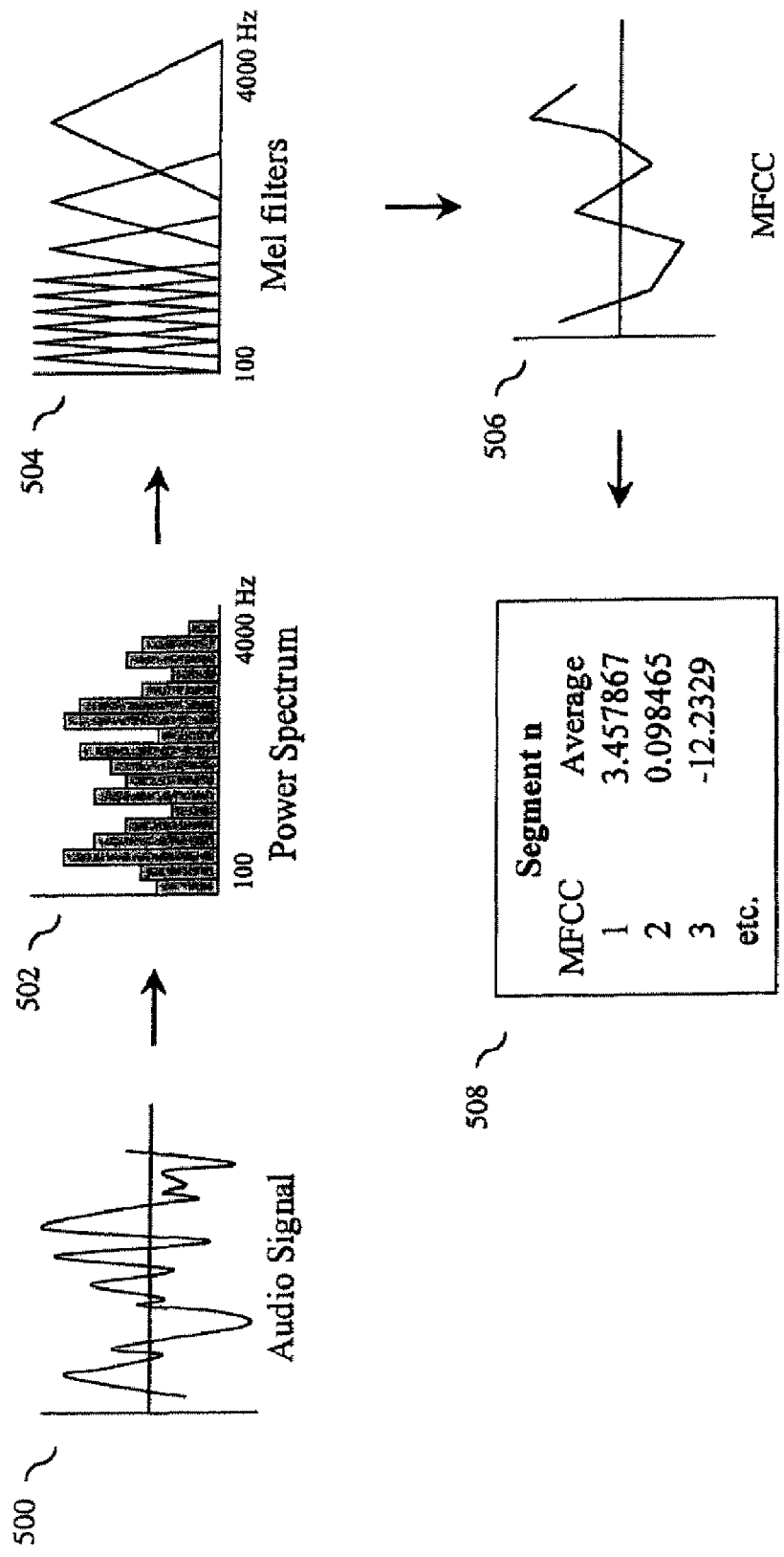
FIG. 5 is a graphical flowchart showing the creating of a segment feature vector according to the present invention.

As mentioned above, once a work has been segmented, the individual segments are then analyzed to produce a segment feature vector. FIG. 5 is a diagram showing an overview of how the segment feature vectors may be created using the methods described in U.S. Pat. No. 5,918,223 to Blum, et al. It is contemplated that a variety of analysis methods may be useful in the present invention, and many different features may be used to make up the feature vector. The inventors have found that the pitch, brightness, bandwidth, and loudness features of the '223 patent to be useful in the present invention. Additionally, spectral features may be used analyzed, such as the energy in various spectral bands. The inventors have found that the cepstral features (MFCCs) are very robust (more invariant) given the distortions typically introduced during broadcast, such as EQ, multi-band compression/limiting, and audio data compression techniques such as MP3 encoding/decoding, etc.

In act 500, the audio segment is sampled to produce a segment. In act 502, the sampled segment is then analyzed using Fourier Transform techniques to transform the signal into the frequency domain. In act 504, mel frequency filters are applied to the transformed signal to extract the significant audible characteristics of the spectrum. In act 506, a Discrete Cosine Transform is applied which converts the signal into mel frequency cepstral coefficients (MFCCs). Finally, in act 508, the MFCCs are then averaged over a predetermined period. In an exemplary non-limiting embodiment of the present invention, this period is approximately one second. Additionally, other characteristics may be computed at this time, such as brightness or loudness. A segment feature vector is then produced which contains a list containing at least the 10 MFCCs corresponding average.

The disclosure of FIGS. 3, 4, and 5 provide examples of means for creating a signature of a sampled work having a segment size and a hop size.

Figure 6:
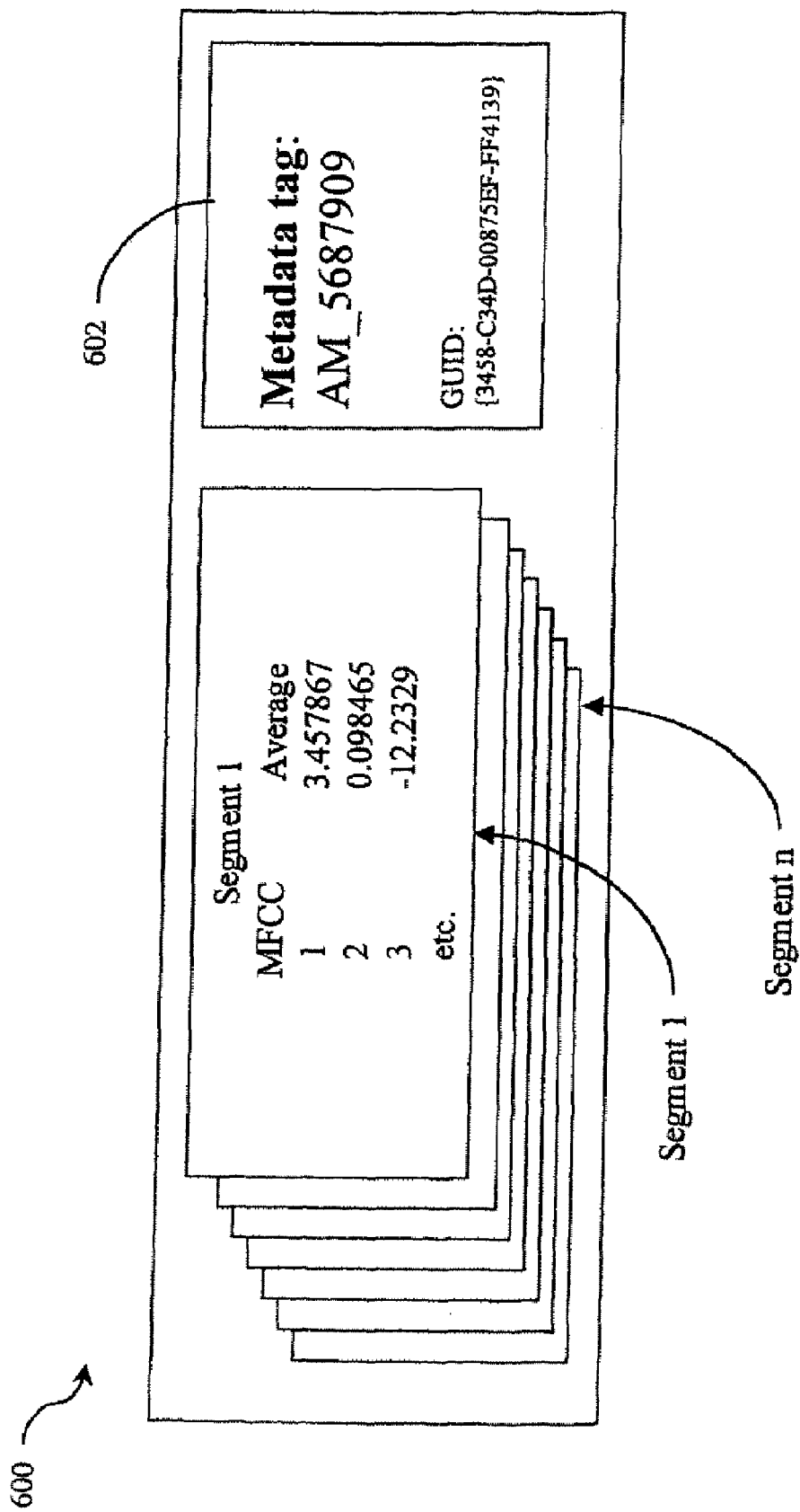
FIG. 6 is a diagram of a signature according to the present invention.

FIG. 6 is a diagram showing a complete signature 600 according to the present invention. Signature 600 includes a plurality of segment feature vectors 1 through n generated as shown and described above. Signature 600 may also include an identification portion containing a unique ID. It is contemplated that the identification portion may contain a unique identifier provided by the RIAA (Recording Industry Association of America) or some other audio authority or cataloging agency. The identification portion may also contain information such as the UPC (Universal Product Code) of the various products that contain the audio corresponding to this signature. Additionally, it is contemplated that the signature 600 may also contain information pertaining to the characteristics of the file itself, such as the hop size, segment size, number of segments, etc., which may be useful for storing and indexing.

Signature 600 may then be stored in a database and used for comparisons.

The following computer code in the C programming language provides an example of a database structure in memory according to the present invention:

```
typedef struct
{
    float hopSize;          /* hop size */
    float segmentSize;      /* segment size */
    MFSignature* signatures; /* array of signatures */
} MFDatabase;
```

The following provides an example of the structure of a segment according to the present invention:

```
typedef struct
{
    char* id;           /* unique ID for this audio clip */
    long numSegments;   /* number of segments */
    float* features;    /* feature array */
    long size;          /* size of per-segment feature vector */
    float hopSize;
    float segmentSize;
} MFSignature;
```

The discussion of FIG. 6 provides an example of means for storing segments and signatures according to the present invention.

A more detailed description of the operation of the present invention will now be provided.

Figure 7A:
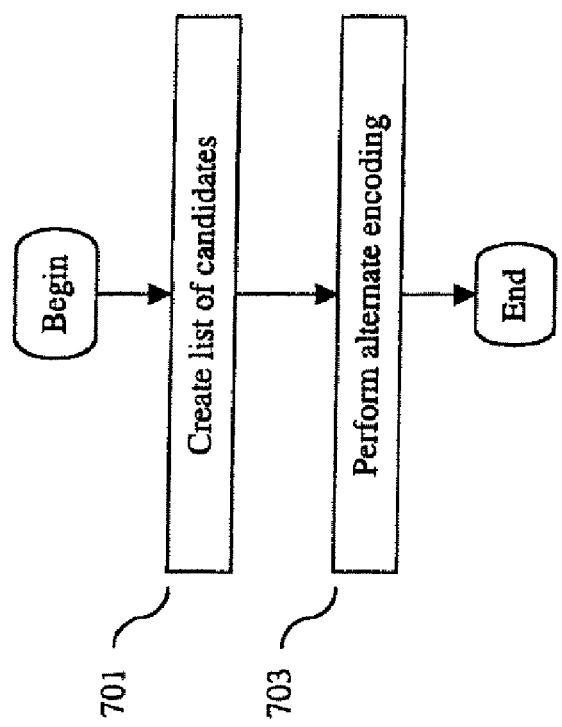
FIG. 7A is a flowchart of a method for preparing a reference database according to the present invention.

Referring now to FIG. 7A, a flowchart showing one aspect of a method according to the present invention is presented.
Reference Database Preparation Prior to the identification of an unknown sample, a database of reference signatures is prepared in accordance with the present invention.

In an exemplary non-limiting embodiment of the present invention, a reference signature may comprise an audio signature derived from a segmentation of the original audio work as described above. In a presently preferred embodiment, reference signatures have 20 non-overlapping segments, where each segment is one second in duration, with one-second spacing from center to center, as described above.

Each of these segments is represented by 10 Mel filtered cepstral coefficients (MFCCs), resulting in a feature vector of 200 dimensions. Since indexing a vector space of this dimensionality is not practical, the number of dimensions used for the initial search for possible candidates is reduced according to the present invention.
Reducing the Dimensionality FIG. 7A is a flowchart of dimension reduction according to the present invention. The number of dimensions used for the initial search for possible candidates is reduced, resulting in what the inventors refer to as a subspace. By having the present invention search a subspace at the outset, the efficiency of the search may be greatly increased.

Referring now to FIG. 7A, the present invention accomplishes two tasks to develop this subspace: (1) the present invention uses less than the total number of segments in the reference signatures in act 701; and (2) the present invention performs a principal components analysis to reduce the dimensionality in act 703.
Using Less Segments to Perform an Initial Search The inventors empirically have found that using data from two consecutive segments (i.e., a two-second portion of the signature) to search for approximately 500 candidates is a good tradeoff between computation complexity and accuracy. The number of candidates can be altered for different applications where either speed or accuracy is more or less important.

For example, the present invention may be configured to extract a predetermined percentage of candidates. In an exemplary non-limiting embodiment of the present invention, a list of candidates may comprise 2% of the size of the reference signature database when using 2 segments for the initial search. In another exemplary non-limiting embodiment of the present invention, a list of candidates may be those reference signatures whose distances based on the initial 2 segment search are below a certain threshold.

As will be appreciated by those of ordinary skill in the art, the dimension reduction of the present invention may be used to perform initial search using fewer segments for data other than MFCC-based feature vectors. It is contemplated that any feature-based vector set may be used in the present invention.

Furthermore, the segments used in the initial search do not have to be the same size as the segments used for the final search. Since it may be better to use as few dimensions as possible in the initial search for candidates, a smaller segment size is advantageous here. The full segment size can then be used in the final search. In an exemplary non-limiting embodiment of the current invention, the initial search may use the higher-order MFCCs (since these are the most robust)—this is a simple way to reduce the dimensionality.

In the next section, we will discuss another, more sophisticated, method for reducing the segment size for the initial candidate search.
Perform Alternate Encoding The second step is to use an alternate encoding of the MFCC data which has the same information but with fewer features.

To accomplish this, the present invention first performs an eigenanalysis of N candidates to determine the principal components of the MFCCs for our typical audio data. In an exemplary non-limiting embodiment of the present invention, the present invention examines 25,000 audio signatures of 20 segments each—each taken from a different recording, which gives provides 500,000 sets of MFCCs. The inventors have found that this is enough to be a good statistical sample of the feature vectors.

As is appreciated by those of ordinary skill in the art, the number examined in the present invention may be adjusted to provide a good statistical sample of different kinds of music. For example, 100 or a 1000 segments may be satisfactory.

Next, a Karhunen-Loève transformation is derived. Each set of 10 MFCCs becomes a column of a matrix A. We then compute $A^T A$ and find the 10 eigenvalues and eigenvectors of this matrix. Sorting the eigenvectors by eigenvalue (largest eigenvalue first) results in a list of orthogonal basis vectors that are the principal components of the segment data. For a database of typical music recordings, 95% of the information in the MFCCs is contained in the first 7 components of this new basis.

As is known by those having ordinary skill in the art, the Karhunen-Loève transformation is represented by the matrix that has the all 10 of the above eigenvectors as its rows. This transformation is applied to all the segments of all the reference signatures in the database as well as to all the segments of any signatures that are to be identified. This allows approximate distances to be computed by using the first few components of the transformed segment MFCC vectors for a small tradeoff in accuracy. Most importantly, it reduces the initial search dimension to 14 (7 components times 2 segments), which can be indexed with reasonable efficiency.

As will be appreciated by those of ordinary skill in the art, dimension reduction according to the present invention may be utilized to examine subspaces for feature sets other than MFCCs. The dimension reduction of the present invention may be applied to any set of features since such sets comprise vectors of floating point numbers. For example, given a feature vector comprising spectral coefficients and loudness, one could still apply the KL-process of the present invention to yield a smaller and more easily searched feature vector.

Furthermore, the transform of the present invention may be applied to each segment separately. For example, prior art identification methods may use a single 30-second segment of sound over which they compute an average feature vector. Of course, the accuracy of such methods are much lower, but the process of the present invention may work for such features as well. Moreover, such prior art methods may be used as an initial search.

The dimension reduction aspect of the present invention provides significant efficiency gains over prior art methods. For example, in a "brute force" method, the signature of the incoming sampled work is tested against every reference signature in the database. This is time-consuming because the comparison of any two signatures is a 200-dimensional comparison and because there are a lot of reference signatures in the database. Either alone are not unsatisfactory, but both together takes a long time. The present invention solves the first problem by searching only a subspace, i.e., using less than all 200 dimensions in the comparison.

In addition to the raw speedup given by searching a subspace, the reduced dimensionality also allows one to practically index the database of reference signatures. As mentioned above, it is impractical to index a 200-dimensional database, but 14 is practical.

The present disclosure thus provides for several manners in which the dimensionality may be reduced:

(1) searching for the top N candidates over a subspace;
 (2) searching for the top N candidates using less than the total number of segments from the reference signature;
 (3) searching for the top N candidates by projecting the reference signatures and signature of the work to be identified onto a subspace; and
 (4) searching for the top N candidates by projecting the reference signatures and signature of the work to be identified onto a subspace, where the subspace is determined by a Karhunen-Loève transformation.

The preparation of the reference database may occur at any time. For example, the results of the preparation may occur each time the server is started up. Additionally, the results could be saved and reused from then on, or the results may be prepared once and used over again. It may need to be recomputed whenever a new reference signature is added to the database.

Computing the Index

The present invention may also compute an index of the reference signatures. As is appreciated by those having ordinary skill in the art, many indexing strategies are available for use in the present invention. Examples include the k-d tree, the SS-tree, the R-tree, the SR-tree, and so on. Any look-up method known in the art may be used in the present disclosure. Common to all indexing strategies is that the multidimensional space is broken into a hierarchy of regions which are then structured into a tree. As one progress down the tree during the search process, the regions become smaller and have fewer elements. All of these trees have tradeoffs that affect the performance under different conditions, e.g., whether the entire tree fits into memory, whether the data is highly clustered, and so on.

In an exemplary non-limiting embodiment of the present invention, a binary k-d tree indexing method is utilized. This is a technique well-known in the art, but a brief overview is given here. At the top level, the method looks to see which dimension has the greatest extent, and generates a hyperplane perpendicular to this dimension that splits the data into two regions at its median. This yields two subspaces on either side of the plane. This process is continued by recursion on the data in each of these subspaces until each of the subspaces has a single element.

After the reference database has been prepared, the present invention may be used to identify an unknown work. Such a process will now be shown and described.

Identification of an Unknown Work

Figure 7B:
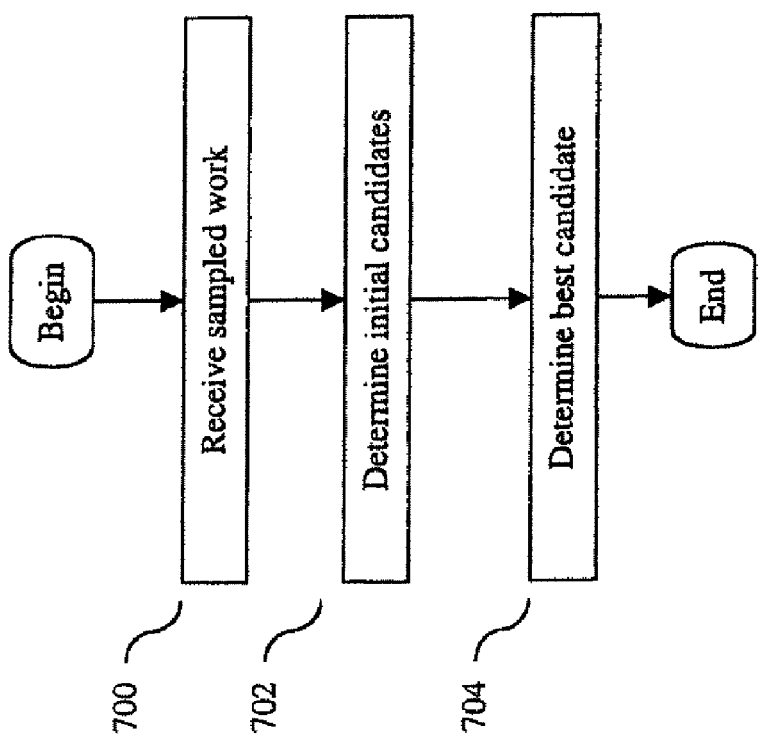
FIG. 7B is a flowchart of method for identifying an unknown work according to the present invention.

Referring now to FIG. 7B, a flowchart of a method for identifying an unknown work is shown. In act 700, the present invention receives a sampled work. In act 702, the present invention determines a set of initial candidates. Finally, in act 704, the present invention determines the best candidate. Each act will now be described in more detail.

Receiving a Sampled Work

Beginning with act 700, a sampled work is provided to the present invention. It is contemplated that the work will be provided to the present invention as a digital audio stream. It should be understood that if the audio is in analog form, it may be digitized in any manner standard in the art.

Indexed Lookup.

In act 702, the present invention determines the initial candidates. In a preferred embodiment, the present invention uses the index created above to perform an indexed candidate search.

An index created in accordance with the present invention may used to do the N nearest neighbor search required to find the initial candidates.

Candidate Search.

Once a set of N nearest neighbors is determined, the closest candidate may then be determined in act 704. In an exemplary non-limiting embodiment of the present invention, a brute-force search method may be used to determine which candidate is the closest to the target signature. In another preferred embodiment, the present invention may compare the distance of this best candidate to a predetermined threshold to determine whether there is a match.

There are a number of techniques that may be applied to the candidate search stage which make it much faster. In one aspect, these techniques may be used in a straightforward brute-force search that did not make use of any of the steps previously described above. That is, one could do a brute-force search directly on the reference signature database without going through the index search of step 702, for example. Since there is some overhead in doing step 702, direct brute-force search may be faster for some applications, especially those that need only a small reference database, e.g., generating a playlist for a radio station that plays music from a small set of possibilities.

Speedups of Brute-Force Search.

Any reference signature that is close to the real-time signature has to be reasonably close to it for every segment in the signature. Therefore, in one aspect, several intermediate thresholds are tested as the distance is computed and the computation is exited if any of these thresholds are exceeded. In a further aspect, each single segment-to-segment distance is computed as the sum of the squared differences of the MFCCs for the two corresponding segments. Given the current computation of the MFCCs, average segment-to-segment distances for matches are about approximately 2.0. In an exemplary non-limiting embodiment of the invention, we exit the computation and set the distance to infinity if any single segment-to-segment distance is greater than 20. In further aspects, the computation is exited if any two segment-to-segment distances are greater than 15, or if any four segment-to-segment distances are greater than 10. It should be clear to anyone skilled in the art that other thresholds for other combinations of intermediate distances could easily be implemented and set using empirical tests.

Since any match will also be close to a match at a small time-offset, we may initially compute the distances at multiples of the hop size. If any of these distances are below a certain threshold, we compute the distances for hops near it. In an exemplary non-limiting embodiment of the invention, we compute distances for every third hop. If the distance is below 8.0, we compute the distances for the neighboring hops. It should be clear to anyone skilled in the art that other thresholds for other hop-skippings could easily be implemented and set using simple empirical tests.

While embodiments and applications of this invention have been shown and described, it would be apparent to those skilled in the art that many more modifications than mentioned above are possible without departing from the inventive concepts herein. For example, the teachings of the present disclosure may be used to identify a variety of sampled works, including, but not limited to, images, video and general time-based media. The invention, therefore, is not to be restricted except in the spirit of the appended claims.

The invention claimed is:

1. A method, implemented by a computing system programmed to perform the following, comprising:
   providing, by the computing system, a reference database containing a plurality of reference works, wherein each reference work corresponds to a reference signature comprising a plurality of reference segments;
   receiving, by the computing system, an unknown work, wherein the unknown work comprises a plurality of unknown segments;
   calculating, by the computing system, at least one distance from one of the plurality of unknown segments to one of the plurality of reference segments;
   if the at least one calculated distance does not meet a predefined threshold, repeating, by the computing system, a calculation for a distance from each subsequent segment of the plurality of unknown segments to each subsequent segment of the plurality of reference segments until the predefined threshold is met; and
   identifying, by the computing system, the unknown work as one of the plurality of reference works based on the calculated distances.

2. The method of claim 1, wherein the predetermined threshold includes one calculated distance greater than 20.

3. The method of claim 1, wherein the predetermined threshold includes two calculated distances greater than 15.

4. The method of claim 1, wherein the predetermined threshold includes four calculated distances greater than 10.

5. The method of claim 1, wherein calculating the at least one distance from one of the plurality of unknown segments to one of the plurality of reference segments comprises:
   calculating a mel frequency cepstral coefficients (MFCC) for the one of the plurality of unknown segments;
   calculating a MFCC for the one of the plurality of reference segments; and
   calculating a sum of squared differences of the MFCCs for the unknown segment and the 6. A non-transitory computer readable storage medium, comprising executable instructions which when executed on a processing system cause the processing system to perform a method comprising:
   providing a reference database containing a plurality of reference works, wherein each reference work corresponds to a reference signature comprising a plurality of reference segments, the segments defining a hop size;
   receiving an unknown work having an unknown signature;
   calculating a distance from the unknown signature to one of the plurality of reference signatures at a point in time in said reference signature;
   if the calculated distance is greater than a predefined threshold, repeating a calculation for a distance from the unknown signature to the reference signature at least one offset point in time in the reference signature until the calculated distance is less than the predefined threshold;
   calculating a distance from the unknown signature to the reference signature at one or more points in time neighboring the point in time where the distance calculated is less than the predefined threshold; and
   identifying the unknown signature as one of the plurality of reference works based on the distances calculated at the one or more neighboring points in time.

7. The non-transitory computer readable storage medium of claim 6, wherein the offset point in time is a point in time one or more multiples of the hop size from the last point in time where the distance was calculated.

8. The non-transitory computer readable storage medium of claim 6, wherein the offset point in time is a point in time three hop sizes from the last point in time where the distance was calculated.

9. The non-transitory computer readable storage medium of claim 6, wherein the one or more neighboring points in time is one or more point in time one hop size from the point in time in the reference signature where the distance calculated is less than the predefined threshold.

10. The non-transitory computer readable storage medium of claim 6, wherein the predefined threshold is 8.0.

11. A computer-implemented apparatus comprising:
   a memory to store a reference database containing a plurality of reference works, wherein each reference work corresponds to a reference signature comprising a plurality of reference segments;
   a processor coupled to the memory to receive an unknown work, wherein the unknown work comprises a plurality of unknown segments;

to calculate at least one distance from one of the plurality of unknown segments to one of the plurality of reference segments;

if the at least one calculated distance does not meet a predefined threshold, to repeat a calculation for a distance from each subsequent segment of the plurality of unknown segments to each subsequent segment of the plurality of reference segments until the predefined threshold is met; and to identify the unknown work as one of the plurality of reference works based on the calculated distances.

12. The system of claim 11, wherein the predetermined threshold includes one calculated distance greater than 20.

13. The system of claim 11, wherein the predetermined threshold includes two calculated distances greater than 15.

14. The system of claim 11, wherein the predetermined threshold includes four calculated distances greater than 10.

15. The system of claim 11, wherein the processor is to calculate the at least one distance from one of the plurality of unknown segments to one of the plurality of reference segments by:

calculating a mel frequency cepstral coefficients (MFCC) for the one of the plurality of unknown segments;

calculating a MFCC for the one of the plurality of reference segments; and calculating a sum of squared differences of the MFCCs for the unknown segment and the reference segment.

* * * * *